US008504397B2

(12) United States Patent
Vempati et al.

(10) Patent No.: US 8,504,397 B2
(45) Date of Patent: Aug. 6, 2013

(54) REAL TIME BUSINESS EVENT MONITORING, TRACKING, AND EXECUTION ARCHITECTURE

(75) Inventors: Shashi Shekhar Vempati, Dallas, TX (US); Girish A. Ramachandra, Bangalore (IN)

(73) Assignee: Infosys Technologies Limited, Bangalore (IN)

( * ) Notice: Subject to any disclaimer, the term of this patent is extended or adjusted under 35 U.S.C. 154(b) by 1048 days.

(21) Appl. No.: 11/816,826

(22) PCT Filed: Feb. 21, 2005

(86) PCT No.: PCT/IN2005/000054
§ 371 (c)(1),
(2), (4) Date: Aug. 26, 2008

(87) PCT Pub. No.: WO2006/087730
PCT Pub. Date: Aug. 24, 2006

(65) Prior Publication Data
US 2009/0037193 A1 Feb. 5, 2009

(51) Int. Cl.
*G06Q 10/00* (2012.01)
*G06Q 10/06* (2012.01)

(52) U.S. Cl.
CPC .................... *G06Q 10/063* (2013.01)
USPC .......................................... 705/7.11; 705/28

(58) Field of Classification Search
None
See application file for complete search history.

(56) References Cited

U.S. PATENT DOCUMENTS

| | | | |
|---|---|---|---|
| 5,119,294 A | 6/1992 | Tanaka | |
| 5,367,452 A | 11/1994 | Gallery et al. | |
| 6,438,696 B1 | 8/2002 | Baran et al. | |
| 6,617,969 B2 | 9/2003 | Mi et al. | |
| 6,697,809 B2 | 2/2004 | Chen et al. | |
| 6,697,810 B2 | 2/2004 | Kumar et al. | |
| 6,754,704 B1 | 6/2004 | Prorock | |
| 7,768,404 B2 * | 8/2010 | Flores et al. | 340/572.4 |
| 2002/0156601 A1 | 10/2002 | Tu et al. | |
| 2003/0018643 A1 | 1/2003 | Mi et al. | |
| 2003/0093307 A1 | 5/2003 | Renz et al. | |
| 2003/0193960 A1 | 10/2003 | Land | |
| 2004/0006537 A1 | 1/2004 | Zelechoski et al. | |
| 2006/0047545 A1 * | 3/2006 | Kumar et al. | 705/7 |
| 2006/0186998 A1 * | 8/2006 | Lin et al. | 340/10.41 |

* cited by examiner

*Primary Examiner* — Faris Almatrahi
(74) *Attorney, Agent, or Firm* — LeClairRyan, a Professional Corporation

(57) ABSTRACT

A computer system (100) enables real-time business event monitoring and tracking by means of a client-server computer asynchronously acquiring (110) physical event data from a variety of network-connected (105) data collection devices (102), processing the event data on the basis of the knowledge and history of previous events, and analyzing the event data using business logic/rules, filters, and/or other criteria to identify (115) "significant" business events for real-time communication to a network (120) of clients (122). The system (100) is bi-directional in that it also receives business information requests from the clients (122) and processes the requests in the light of the knowledge and history of previous client requests to generate a plurality of device-specific control commands for execution on one or more of the data collection devices (102).

15 Claims, 7 Drawing Sheets

REAL TIME BUSINESS EVENT MONITORING, TRACKING, AND EXECUTION ARCHITECTURE

FIELD OF THE INVENTION

The present invention relates generally to methods and systems for an edge based real time application execution architecture and engine and, more specifically, to methods and systems for a generalized engine architecture that can be configured and customized to specific enterprise information systems.

BACKGROUND OF THE INVENTION

Deploying article identification and physical events monitoring technologies, such as radio frequency identification (RFID), in enterprise-wide scenarios pose significant challenges. Because a vast amount of identification and events data is generated from numerous disparate data acquisition devices, such as RFID readers, bar code scanners, video cameras, and other sensors, it can be challenging to intelligently process data such that information important to a business is effectively and efficiently isolated and analyzed, identification and events data is integrated and communicated with legacy Enterprise Information (EI) systems, such as enterprise resource planning (ERP), customer relationship management (CRM), and supply chain management (SCM) systems, and data are interpreted meaningfully to facilitate optimal business decisions and operations. It is also becoming increasingly difficult to proactively control and coordinate data acquisition systems such that they can be configured to acquire the best, and most important, event data in the light of historical data.

There currently exist remote data capture and processing systems such as retail Point-Of-Sale (POS) terminals, kiosks and vending machines deployed in stand-alone vertical applications such as a typical retail store inventory management system. Examples of such prior art systems are described below.

U.S. Pat. No. 5,119,294, entitled "POS terminal group management device with memory for pre-storing different collection data ranges for each POS terminal", describes a transaction processing system including a plurality of POS terminal devices (cash registers), a POS terminal group management device (cluster controller) and a sales management device (store controller), where totalized data are transmitted from the POS terminal devices to the sales management device through the POS terminal group management device in accordance with totalization pattern information respectively associated with each individual POS terminal device, which information is pre-stored in the group management device.

U.S. Pat. No. 5,367,452, entitled "Mobile merchandising business management system which provides comprehensive support services for transportable business operations", describes a computer based system for providing a business support services for mobile business operations such as merchandising carts and kiosks. The services include: i.) providing a two-way computerized communication link between the mobile business unit and a headquarters base station via radio telemetry or ground lines, ii.) a data capture facility which polls a variety of intelligent devices, such as temperature sensors and inventory level indicators, packages the data for subsequent transmission to the base station and summaries the data for display on the mobile system control panel, iii.) a base station communication facility which transmits messages and computer commands to remote carts and kiosks and initiates outbound paging, and iv.) a base station mass storage and reporting facility which stores historical data related to product sales, cashier settlement, inventory control and in bound messages for subsequent retrieval and reporting.

U.S. Pat. No. 6,754,704, entitled "Methods, systems, and computer program product for remote monitoring of a data processing system events", describes methods, system, and computer program products that facilitate monitoring of data processing system events. For example, data processing system event data may be collected and sent to an event handler program module. Once the event handler program module receives the data processing system event data, a remote program module, which resides in a different address space than the event handler program module, may be notified. The data processing system event data may then be sent from the event handler program module to the remote program module. Data processing data may be sent from the event handler program module to the remote program module as events occur, thereby providing event notification in real-time.

U.S. Pat. No. 6,438,696, entitled "Security monitoring arrangement for a computer system", describes an electronic point-of-sale (PoS) system comprising a network with a number of PoS terminals and a PoS server computer attached thereto. The PoS terminals and the PoS server interact over the network to perform conventional PoS transactions. Additionally, each of the PoS terminals monitors its own operation for predetermined security-related events (such as refunds or voids). Upon detection of such an event, the PoS terminal sends an alert message and data over the network to a control computer (which may be the PoS server computer, or may be a separate computer). The control computer responds to the alert message by activating a video camera and recorder to record a view of the PoS terminal, along with the data.

The prior art data acquisition and processing systems and methods are highly customized for operation in specific business scenarios, thereby acting as independent data acquisition systems that are not adaptable to the wide range of applications required by the large scale, varied legacy and EI systems typically deployed in large companies. These prior art systems are not configurable to implement changing business conditions and decision logic and therefore lack adaptability. Additionally, prior art systems lack the capability of using present and historical events data to strategically re-configure and/or re-deploy data acquisition systems for newer purposes.

Accordingly there is a need for a generic real-time events data acquisition and processing engine architecture that is deployable to encompass diverse business scenarios and also integrates a plurality of events data acquisitions systems with a plurality of EI systems, thereby allowing a two-way events and control data communication to enable organic adaptability.

SUMMARY OF THE INVENTION

It is an object of the present invention to describe methods, systems, and computer program products to implement an edge based real time RFID network application execution architecture and engine system that is capable of asynchronously acquiring a plurality of physical event data, processing the event data on the basis of the knowledge and history of previous events and analyzing the event data using a plurality of business logics, filters and/or criteria to identify significant business events for real-time communication to a plurality of Enterprise Information (EI) systems. Similarly, the invention is capable of asynchronously receiving business requests from the plurality of EI systems and processing the requests in light of the knowledge and history of previous requests to generate a plurality of device-specific control commands for execution on one or more data collection devices.

Accordingly, a plurality of data collection adaptors acquire event data triggered by one or more data collection devices associated with a plurality of read points. The data collection adaptors correspond to a plurality of read points, which in one exemplary embodiment may include point-of-sale read points, sales floor shelf read points, and/or back room shelf read points for a conventional retail store inventory presence awareness and management system. In another exemplary embodiment the read points may include conveyor read points, a dock door read points and a put away shelf read points in a conventional supply chain logistics environment of a warehouse. Other read points characteristic of EI systems such as legacy, enterprise resource planning (ERP), customer relationship management (CRM) systems, merchandise managements systems, yard management systems, transportation management systems, and asset management systems are included in the scope of this invention. Also, each read point may further deploy one or more networked data collection devices such as RFID readers, bar-code scanners, motion detectors, thermal sensors, pressure sensors, volume-level sensors, smart-card readers, weight sensors, moisture sensors, contact-less payment systems, biometric sensors, Bluetooth enabled devices, 802.11b enabled devices, infrared scanners, electronic displays, magnetic card readers, electronic scales, voice detectors, humidity sensors, gravitometers, accelerometers, or any other sensor device known to those skilled in the art.

The data collection adaptors communicate event data to a data acquisition and control engine (the "Control Engine") module that collects, correlates and processes event data on the basis of historical data and/or any other filter criteria to identify potential business events. The so identified potential event data is then communicated to a real-time decision making engine module.

The decision making engine module analyzes the received potential event data on the basis of historical events and on the basis of one or more programmed business logic to identify trends leading to significant business events.

The significant events isolated by the decision-making engine module are communicated to a plurality of business integration adaptors that interface with a plurality of EI systems. The business integration adaptors correspond to a plurality of event use case states, that in one exemplary embodiment may include a receiving state, a check-out state and an inventory monitor state for a typical retail store inventory management system. In another exemplary embodiment the use case states may include a receiving state, a shipping state and a put away state in a typical supply chain logistics environment of a warehouse. Other scenarios of use case states characteristic of EI systems would be readily evident to persons of ordinary skill in the art.

According to another aspect of the invention, business integration adaptors dispatch business requests, received from EI systems, to the decision making engine module that further process these requests to generate application commands corresponding to the EI system that generated the business request. The application commands are then communicated to the control engine module that further processes them to generate device-specific control commands for dispatch to the appropriate data collection adaptors. The data collection adaptors then execute the control commands on associated one or more data collection devices.

It is another object of the present invention to allow for the functional modules described above to be adaptable and self-provisioning with the changes in business conditions and network infrastructure environments. Therefore, according to a yet another aspect of the invention the EI systems may issue requests to not only re-configure operations of the data collection devices, but also issue requests for updating programming codes of the functioning software components of the invention. Thus, for example, new business logic can be provisioned to the decision making and control engine modules, respectively, via business requests from EI systems.

It is still another object of the present invention to allow real-time asynchronous communication of data between the functional modules described above. Accordingly, the functional components, in one embodiment, implement the Observer interface and Observable class provided in the JAVA programming language class library.

In one embodiment, the system comprises a plurality of read points having a plurality of data collection devices associated thereto and a plurality of computing devices capable of receiving, processing, and transmitting data. The inventive method controls, coordinates and re-deploys the data collection devices by asynchronously acquiring business requests from a plurality of enterprise systems, analyzing the business requests to generate application commands, processing application commands to generate control commands, asynchronously dispatching the control commands for execution on the corresponding data collection devices, acquiring events data from the plurality of data collection devices, correlating and processing the acquired events data using historical events data to identify potential events data, analyzing the potential events data using business logic to determine a plurality of significant business events, and aggregating and dispatching the significant business events to the plurality of enterprise systems.

Optionally, the data collection devices comprise at least one of an RFID reader, bar-code scanner, motion detector, thermal sensor, pressure sensor, volume-level sensor, smart-card reader, weight sensor, moisture sensor, contact-less payment system, biometric sensor, Bluetooth enabled device, 802.11b enabled device, infrared scanner, electronic display, magnetic card reader, electronic scale, voice detector, humidity sensor, gravitometer, or accelerometer. Optionally, the enterprise system comprises at least one of legacy, enterprise resource planning systems, customer relationship management systems, supply chain management systems, warehouse management systems, merchandise managements systems, yard management systems, transportation management systems, or asset management systems.

Optionally, the potential events data correspond to a change in a state of an object generating the events data. The business logic is modified based on the historical events data.

In another embodiment, the invention is a system for integrating a plurality of data collection devices with a plurality of enterprise systems, comprising a plurality of physical data collection adaptors for interfacing with the plurality of data collection devices to asynchronously acquire events data; a real-time control and data acquisition engine for correlating and processing the acquired events data using historical events data to identify potential events data; a real-time decision making engine for analyzing the potential events data using a plurality of business logic to determine significant business events; and a plurality of business integration adaptors for asynchronously aggregating and dispatching the significant business events to the plurality of enterprise systems.

In another embodiment, the invention is a system for controlling, coordinating and re-deploying a plurality of data collection devices, comprising a plurality of business integration adaptors for asynchronously acquiring business requests from a plurality of enterprise systems; a real-time decision making engine for analyzing the business requests to generate application commands; a real-time control and data acquisition engine for processing application commands to generate control commands; and a plurality of physical data collection adaptors for asynchronously dispatching the control commands for execution on the corresponding data collection devices.

Optionally, the system further comprises an update module for updating code operative in at least one of the decision making engine, the control and data acquisition engine, or the physical data collection adaptors. The update module provides updated business logic to be used in determining significant business events. The business logic is modified based upon a plurality of historical events data.

BRIEF DESCRIPTION OF THE DRAWINGS

These and other features and advantages of the present invention will be appreciated, as they become better understood by reference to the following Detailed Description when considered in connection with the accompanying drawings, wherein.

DETAILED DESCRIPTION OF THE INVENTION

Figure 1:
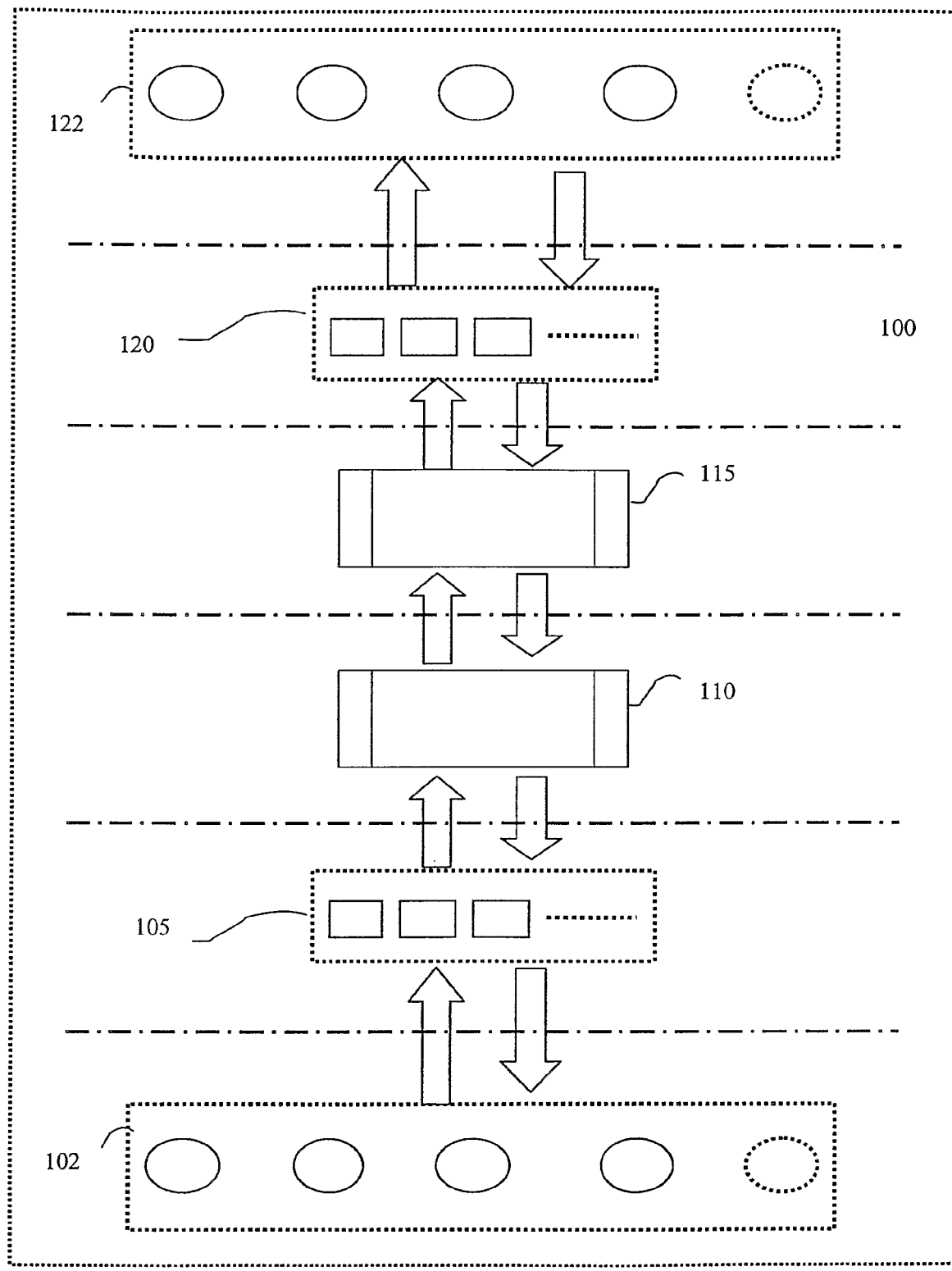
FIG. 1, is a block diagram illustrating the functional components of an edge based real time RFID network application execution architecture and engine.

FIG. 1 shows a block diagram of an Edge based Real Time Network Application Execution Architecture and Engine system 100 comprising a plurality of functional component modules. In one embodiment, the system 100 comprises a Real Time Control and Data Acquisition Engine module 110 and a Real Time Decision Making Engine module 115. Module 110 gathers, correlates and processes physical event data detected asynchronously from a plurality of data collection devices 102 via a plurality of state-less, plug and play physical data collection adaptor modules 105 for interfacing with the plurality of physical automatic data collection devices 102, including, but not limited to RFID readers, bar-code scanners, motion detectors, thermal sensors, pressure sensors, volume-level sensors, smart-card readers, weight sensors, moisture sensors, contact-less payment systems, biometric sensors, Bluetooth enabled devices, 802.11b enabled devices, infrared scanners, electronic displays, magnetic card readers, electronic scales, voice detectors, humidity sensors, gravitometers, accelerometers, or any other sensor device known to those skilled in the art. Module 115 interprets the business significance of the physical events acquired from the plurality of data collection devices 102 and interfaces with a plurality of stateless, plug and play business integration adaptor modules 120 for integrating with a plurality of enterprise information (EI) systems 122 such as legacy, enterprise resource planning (ERP), customer relationship management (CRM) systems, and/or supply chain logistics business systems, including but not limited to warehouse management systems, merchandise managements systems, yard management systems, transportation management systems, and asset management systems.

The system 100 operates with at least a two-way functionality where, concurrent with physical event data from data collection devices 102 being acquired via adaptors 105 and processed by engine modules 110 and 115 for communication to information systems 122 via adaptors 120, business requests from information systems 122 are acquired asynchronously via adaptors 120, processed into application commands by engine modules 110 and 115, and executed as device specific commands via adaptors 105 to effect control of the plurality of data collection devices 102.

The functional components of the system 100 may communicate data across heterogeneous networks operable in a plurality of configurations such as client-server or peer-to-peer. Examples of networks useful with the invention include intranets, extranets, internets, local area networks, wide area networks, wireless networks or other network arrangements as would be known to those of skill in the art. These networks may comprise disparate hardware and software systems from a plurality of vendors and use a plurality of communication protocols. Communication can be effectuated though any form of data communications, including wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of data communications as will occur to those of skill in the art. Data collection devices 102 may comprise a plurality of networks that may still further comprise disparate devices such as RFID readers, bar-code scanners, motion detectors, thermal sensors, pressure sensors, volume-level sensors, smart-card readers, weight sensors, moisture sensors, contact-less payment systems, biometric sensors, Bluetooth enabled devices, 802.11b enabled devices, infrared scanners, electronic displays, magnetic card readers, electronic scales, voice detectors, humidity sensors, gravitometers, accelerometers, or any other device known to those skilled in the art.

It is also an intention of the inventors to deploy the functional components of the system 100, as a distributed and scalable system. Thus hardware and software components of each layer 1 to 6 of the system 100, may reside at a plurality of different geographical locations. For example, while layers 1 and 2 may typically reside locally and communicate over a typical LAN, such as an Ethernet network, layers 3 to 6 may be deployed at remote locations and communicate over a WAN and/or the Internet.

In one embodiment of the present invention, communication is established among the functional components of the system 100, including EI systems 122, engine modules 110, 115, adaptor modules 105, 120 and data collection devices 102, via a distributed object Application Programming Interface (API) such as the JAVA Remote Method Invocation (RMI) API, the Common Object Request Broker Architecture (CORBA) API, or the Distributed Component Object Model (DCOM) API. The distributed object API is configured to enable the functional components of the system 100 to be implemented as part of an object-oriented system that has objects distributed across a heterogeneous network. Thus, the functional component objects of the system 100 may be distributed across different data processing systems in a network and yet appear to each other as if they were local.

It is also preferred that the communication of data, among the functional components of the system 100, occur asynchronously allowing for events to be acquired from data collection devices 102, processed, analyzed and dispatched by the engine modules 110, 115 to the EI systems 122 as and when they occur, thereby providing event acquisition and notification in real-time. Similarly, business requests from EI system 122 are received and executed as device control commands on the data collection devices 102 asynchronously. As a result the functional components of the system 100 need not expend processing resources in iterative polling to determine if any events have occurred and/or any business requests have been issued.

To effect notification of upper subsequent layers in system 100 when, for example, adaptor layer 2 receives event data and to trigger notification of lower layers when, for example, integration adaptor layer 5 receives business requests, the software components of the system 100 are configured, in one embodiment, to use the "Observer" interface and the "Observable" class provided in the JAVA programming language class library. As known to persons of ordinary skill in the art, an "Observer" object is any object that wishes to be notified when the state of another object changes. An "Observable" object is any object whose state may be of interest and in whom another object may register an interest. For example, the physical data collection adaptor modules 105 are implemented as Observable classes and methods defined to track whether event data has been generated by the data collection devices 102. Also, the engine module 110 implements the Observer interface by defining an "update" method, which is called whenever the Observable object, i.e. the adaptor modules 105 in this example, changes state by receiving event data from the data collection devices 102 and announces this state change to the Observer, i.e. the engine module 110 in this example, by calling a "notifyObservers" method. Additionally, when business requests received from the EI systems 122 are processed and dispatched by the engine module 110, as device control commands, asynchronously to the adaptors 105, the adaptor modules 105 function as Observers while the engine module 110 functions as an Observable class.

Since the system 100 operates a two way communication service, the functional components of each layer act as Observers of the change of state of the components of the layer immediately below them and act as Observables for the components of the layer immediately above them. Therefore, in a preferred embodiment, functional components of each layer implement the Observer interface and also extend the Observable class.

The aforementioned plurality of functional component modules of system 100 are embodied as methods, systems and/or computer program products. Thus, the present invention system 100 is embodied in hardware and/or in software (including firmware, middleware, resident software, microcode, etc.) as henceforth described.

Figure 2:
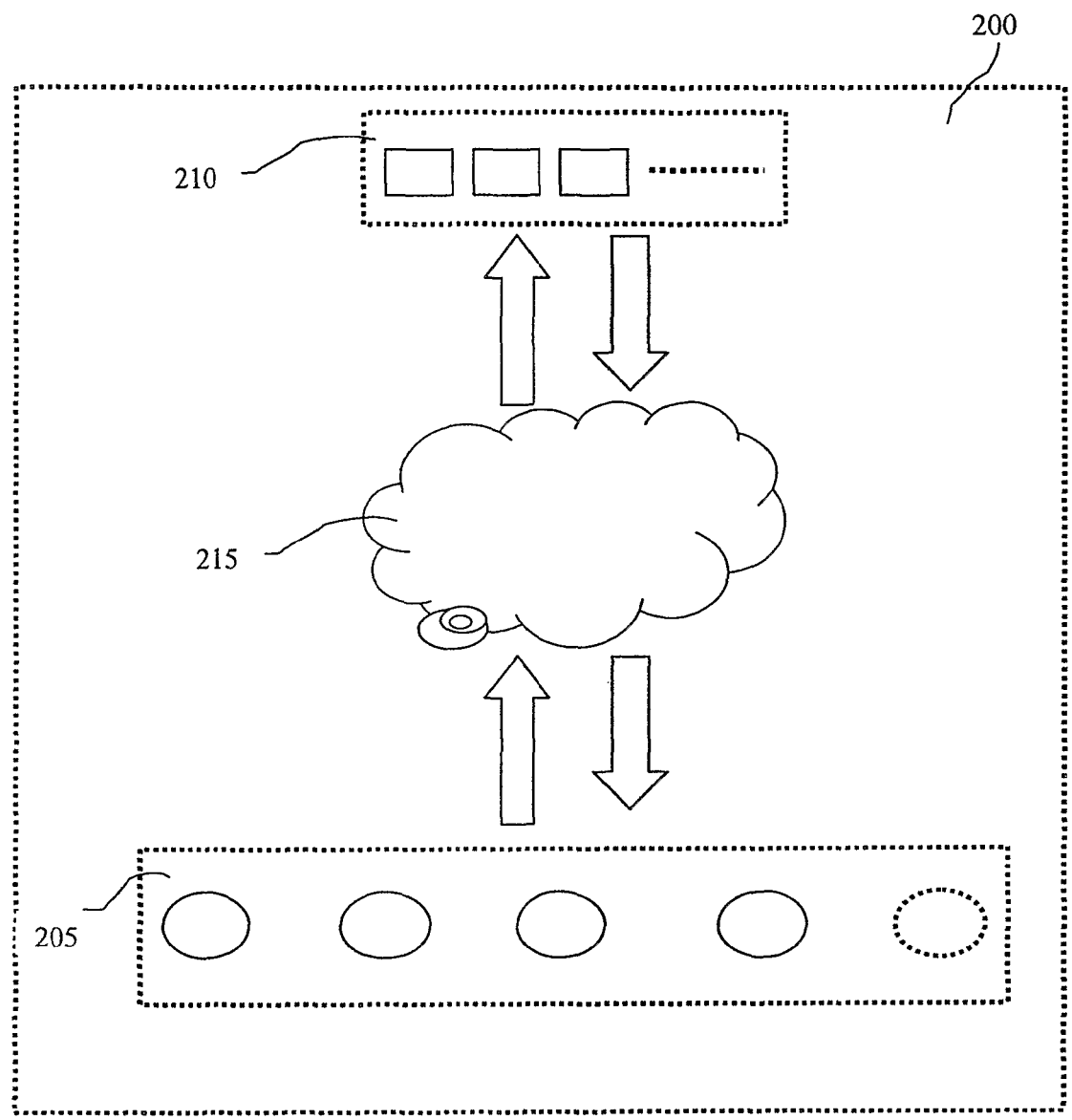
FIG. 2, is a physical event data collection system in accordance with one embodiment of the present invention.

Referring now to FIG. 2, an exemplary real time physical event data collection system 200 in accordance with the present invention comprises a plurality of physical event data collection devices 205 in communication with one or a plurality of physical event collection adaptors 210 through a network 215, such as an Ethernet network. In an exemplary embodiment the one or plurality of adaptors 210 are embodied as stateless plug and play data processing systems/computer systems and configured with computational, storage and control program resources to network, control and acquire physical events by triggering the gathering of event data from one or plurality of data collection devices 205 that occur as a result of specific business events.

Figure 3:
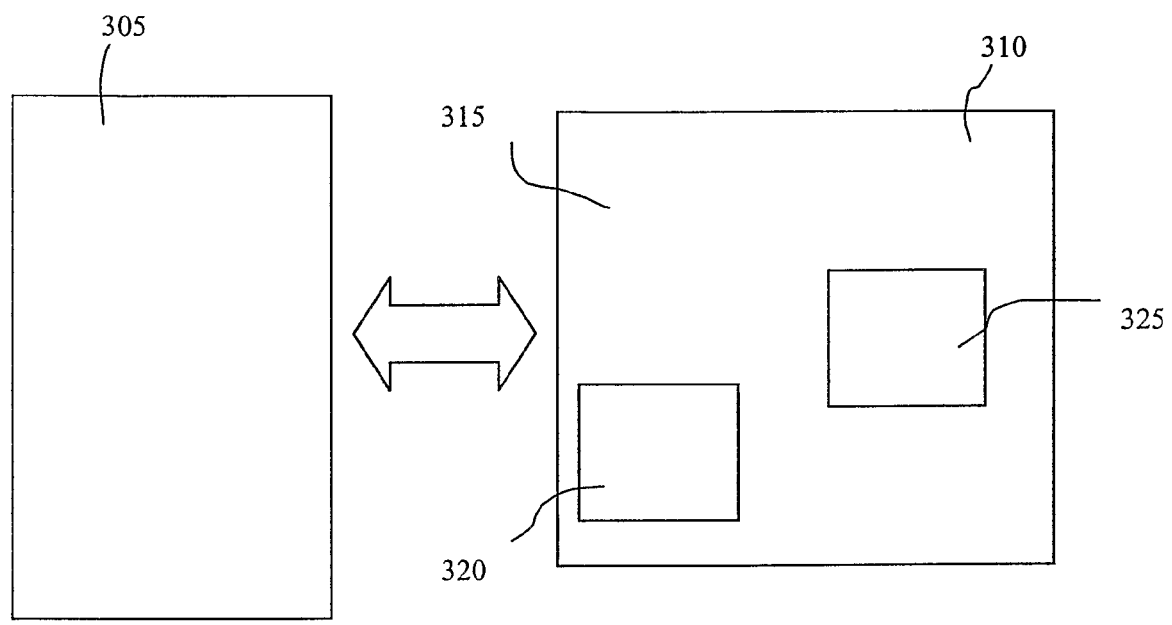
FIG. 3, is a block diagram that illustrates a processor and a memory that is configured with physical event collection adaptor software for use in an event data collection system in accordance with one embodiment of the present invention.

FIG. 3, illustrates a processor 305 and a memory 310 that may be used in embodiments of the physical event collection adaptors 210 of FIG. 2. In one preferred embodiment the memory 310 comprises an operating system 315 for general operation control and resources management, a real time read point event data collection software module 320 and a distributed object Application Programming Interface (API) module 325. The read point event data collection module 320 acquires all physical events that are detected by the corresponding read point event data collection devices and logged in the memory 310 of the adaptor system 210 of FIG. 2.

As discussed with reference to FIG. 1, the plurality of physical event collection adaptors 105 send the physical event data acquired from the plurality of event data collection devices 102 to a real time control and data acquisition engine 110. In one embodiment engine 110 is embodied as a software program module executing on a general purpose microprocessor computer system known to persons of ordinary skill in the art. Additionally, a distributed object API module is also implemented on the computer system to allow the engine module 110 to be implemented as part of an object-oriented system that has objects distributed across a heterogeneous network.

In one embodiment adaptors 105 operate as a client application and the engine module 110 operates as a server application in receiving the physical event data. One embodiment of the invention configures the adaptors 105 and the engine module 110 to communicate using a socket interface known to persons of ordinary skill in the art.

The engine module 110 aggregates and processes incoming physical event data to identify potential business events. In one exemplary embodiment the engine module 110 is configured to aggregate, correlate, and filter streams of RFID tag or sensor event data transmitted from one or more RFID reader devices prior to sending the data to the Real Time Decision Making Engine module 115. For example, a RFID tagged object that is proximate to an RFID reader, and remains in the same position, generates many redundant reads. The engine module 110 filters are programmed to process event data on the basis of the knowledge and history of previous events in order to, for example, discard repetitive data that indicates the continued presence of the RFID tagged object proximate to the RFID reader and/or trigger an action or event only when there is a change in the state for the object which is classified as a potential business event. Thus, a potential business event is said to have occurred when the tagged object is outside of the scanning range of the RFID reader or a new tagged object is placed proximate to the scanning range of the RFID reader. A plurality of such filter criteria may be programmed into the engine module 110 according to varying business scenarios and requirements.

The potential business events so identified by the engine module 110 are communicated to the real time decision making engine module 115. In one embodiment, the decision making engine 115 is also embodied as a software program module executing on a general purpose microprocessor computer system along with a distributed object API module as described with reference to the engine module 110 earlier.

The decision making engine module 115 analyzes the plurality of potential business events communicated by the engine module 110 to identify, select, and/or determine significant business events. For this, in one exemplary embodiment, the decision making engine 115 is programmed to implement a plurality of business logics such as, classifying the received potential business events into a plurality of categories, such as severe error events, warning events, low inventory events, theft events, events requiring action, excess inventory events, or other information events.

In another embodiment, the received potential event data is scrutinized on the basis of a plurality of criteria, such as the number of times an event has occurred, the event severity, an event that would require a business decision, a date range in which an event occurs or any other suitable criteria that would vary based on the business scenario and that is contingent on a number of variables such as the location of, or occurrence of, an event. For example, as discussed earlier if a tagged object moves from, for example, a shelf in a retail store, the corresponding shelf RFID reader data is classified as a potential business event by the engine module 110 and communicated to the decision making engine 115. If a number of tagged objects are no longer proximate to a plurality of shelf readers, a plurality of corresponding potential events are generated that may be determined to be a significant business event by the decision making engine module 115 on the basis of a minimum threshold count of the tagged objects that must remain on the shelf. A plurality of triggering threshold criteria can be programmed into the decision making engine 115.

The significant business events so identified by the decision making engine module 115 are communicated to a plurality of business integration adaptors 120. Referring now to FIG. 3, an exemplary business integration adaptor system 300 in accordance with the present invention comprises a plurality of enterprise information (EI) systems 305 in communication with a plurality of business integration modules 310 through a network 315. In one embodiment, the plurality of business integration modules 310 are embodied as stateless plug and play software component modules executable on a data processing systems/computer systems 320 that is configured with computational, storage and control program resources known to persons of ordinary skill in the art, along with a distributed object API module described earlier.

The business integration modules 310 act as an interface for the EI systems 305, gather the plurality of significant business events generated by the real time decision making engine 115 of FIG. 1, and forward them to the specific EI system for which the significant business event pertains. For example, a significant event identified as the reduction of a particular tagged object on a retail store shelf is forwarded by the integration module 310 to an ERP system that may sense this significant business event as a depletion of the tagged object and triggers the generation of a purchase order for the tagged object.

As discussed earlier with reference to FIG. 1, the system 100 not only acquires and analyzes physical events but also performs control and management services by coordinating the functioning of the plurality of data collection devices 102. Thus, in an exemplary embodiment where the data collection devices 102 are a network of RFID readers, the system 100 receives reader-generated data and transmits administration and control commands to the RFID devices. For example, if RFID readers in close proximity emit radiation of nearly the same frequency at the same time, they may cancel each other out. In addition, RFID reader operation may activate other sensors, such as motion detectors thereby requiring corrective actions to be taken. Thus, in one embodiment the functional components of the system 100, are programmed to implement loop back control so that initial event data collected is analyzed and used to modify the way subsequent data can be collected, if required.

Referring back to FIG. 1, the EI systems 122 may issue a plurality of business requests on the basis of the significant business events reported by the decision making engine module 115. These business requests are received by the decision making engine module 115 and analyzed to generate corresponding application commands that are then dispatched to the data acquisition and control engine module 110. The engine module 110 further processes the received application commands to generate data collection device control commands that are asynchronously dispatched to the event collection adaptor modules 105 that correspond to the data collection devices 105 over which the control commands are meant to be executed.

In one embodiment where the data collection devices 102 are a network of RFID readers, a supplier may change the RFID tag orientation on a pallet of items. This change in tag orientation may be sensed by the engine module 110 as a potential event and further analyzed as a significant event by the decision making engine 115 on the basis of, for example, repeated reporting of missing reads/read failures. The case of missing reads, categorized as a significant business event, is then forwarded to the specific EI system, for example a supply chain management (SCM) system, which may attribute the case of missing reads/read failures to a reduction in read accuracy due to a potential change in RFID tag orientation. The SCM system may then take corrective actions by issuing a request to change the power level emitted from the associated RFID reader devices. Additionally and/or alternately, the SCM may compensate for the missing reads/read failures by issuing requests to nearby RFID readers to focus attention on obtaining the missing reads/read failures.

The system 100 is programmed to be adaptable and self-provisioning with the changes in business conditions and network infrastructure environments. Therefore, in another exemplary embodiment the EI systems 122 may issue requests to not only re-configure operations of the data collection devices 105 at the edge of the system 100, but also issue requests for updating programming codes of the functioning software components of the system 100, such as the integration and data collection adaptor modules 120, 105 and/or the engine modules 110, 115. Thus, new business logic is provisioned to the engine modules 110 and/or 115 via business requests from EI systems, e.g. in order to change the event data filtering behavior and/or provide new business logic code.

Figure 4:
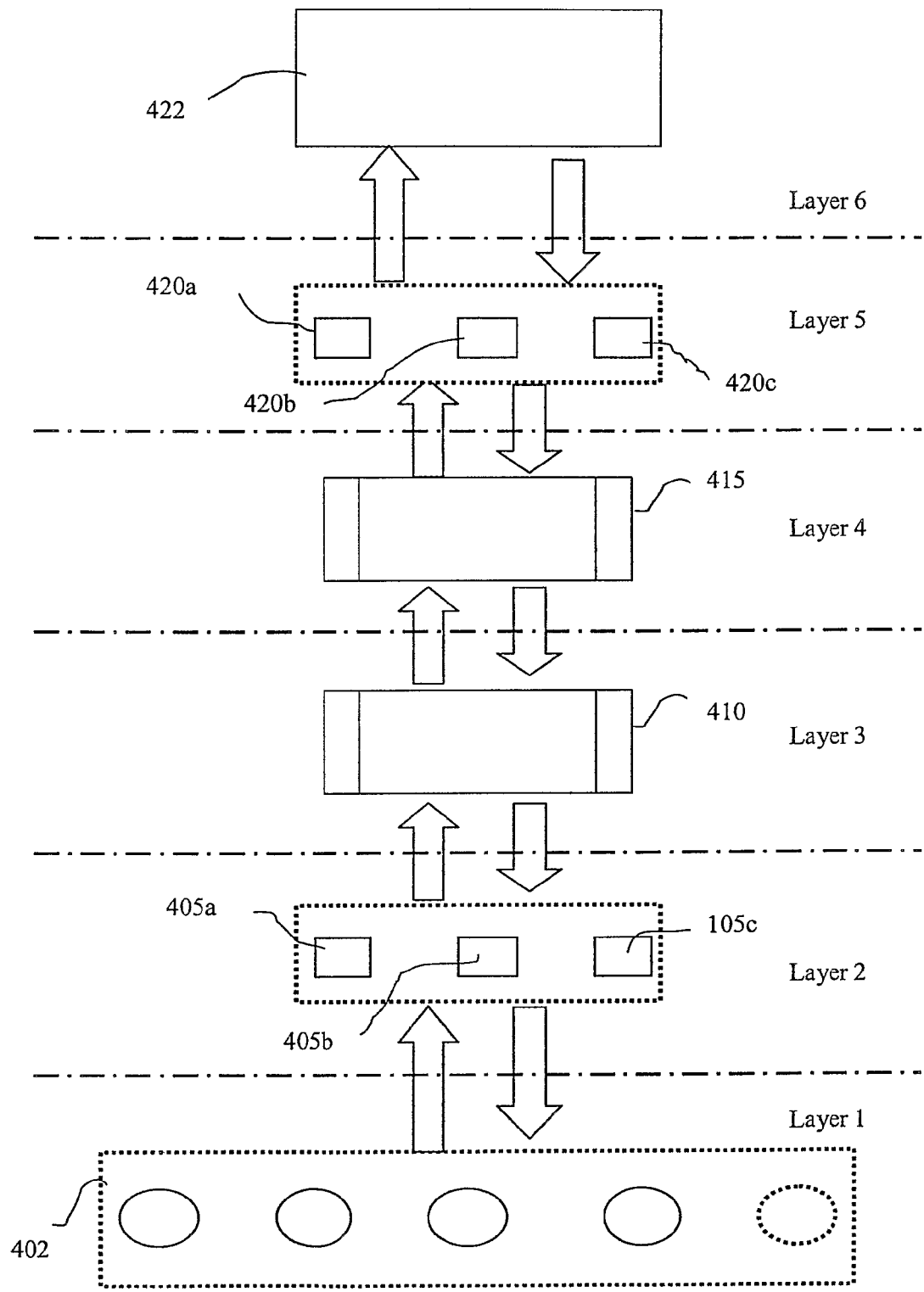
FIG. 4, is a block diagram of the real time RFID network application execution architecture and engine, configured to operate in a logistics environment.
Figure 6:
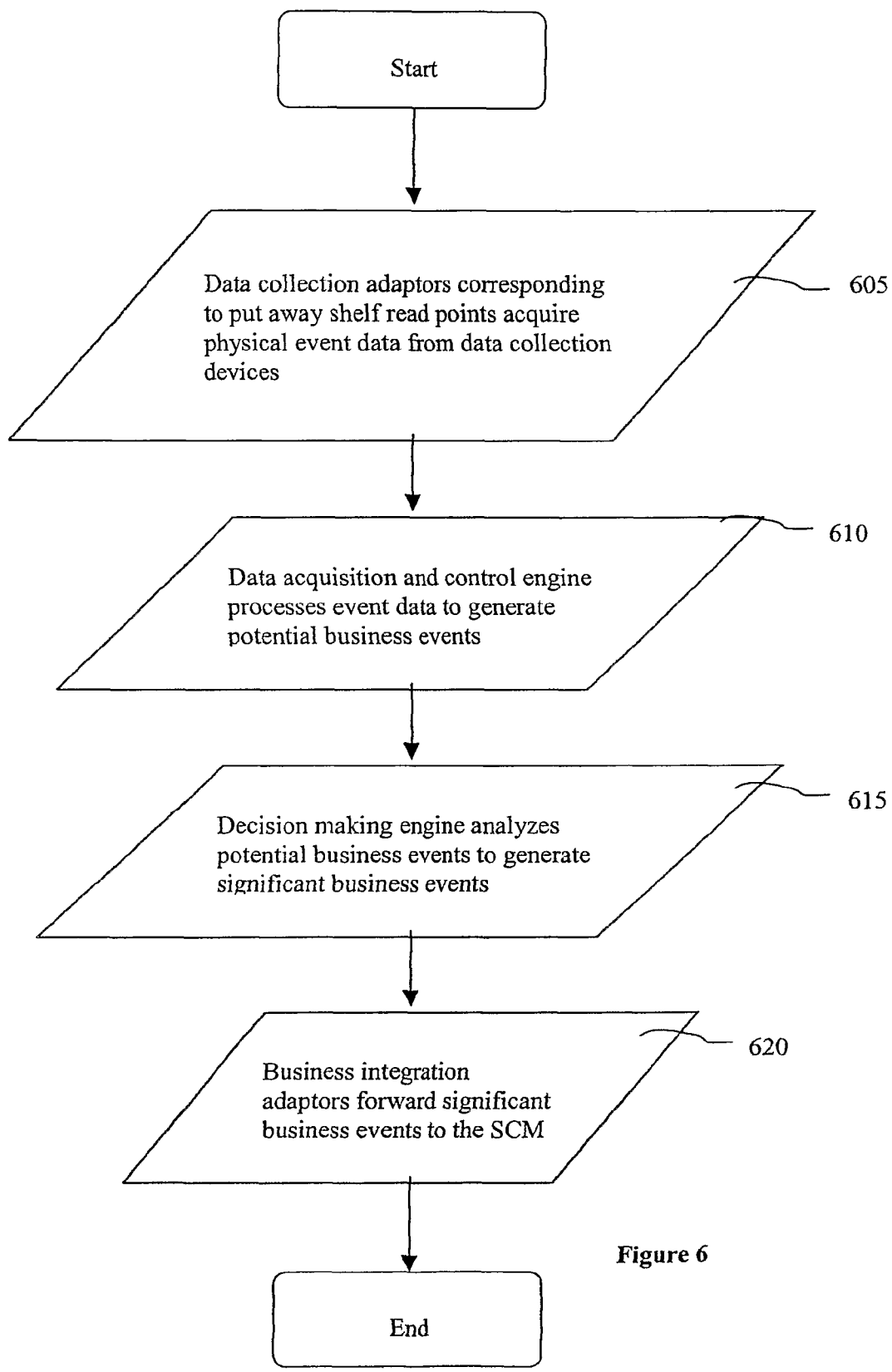
FIG. 6, is a flow chart that illustrates exemplary operations of the edge based real time RFID network application execution architecture and engine for event monitoring in accordance with one embodiment of the present invention.

The flow diagram of FIG. 6 depicts an exemplary operation of the system 100 of FIG. 1, configured and customized to function in a real-time supply chain logistics environment, as shown in FIG. 4. Referring now to FIGS. 4 and 6a simultaneously, the data collection adaptors 405a, b and c correspond to different read points in a warehouse, such as a conveyor read point, a dock door read point and a put away shelf read point. Adaptors 405a through c at each of these read points asynchronously acquire 605 physical event data generated by the plurality of data collection devices 402, such as RFID readers and motion detectors. The event data is communicated asynchronously to the data acquisition and control engine 410 that processes 610 the event data to detect a change in the state of the read points, as potential business events, based on the knowledge and history of events that have previously occurred with respect to the read points. The potential business events so identified in step 610, are communicated asynchronously to the decision making engine module 415 that further analyzes 615 the potential business events on the basis of a plurality of business logics, categorizations and/or filter criteria to generate significant business events. For example, a particular reduction in the read counts of tagged items on the put away shelf read point may be identified as a significant business event by the decision making engine 415.

In one embodiment, the business integration adaptors 420a, b and c can correspond to different use case states for a typical supply chain management (SCM) system, such as a receiving state, a shipping state and a put away state. Adaptors 420a through c for each of the use case states asynchronously receive the significant business events generated by the decision making engine 415. In an exemplary embodiment, the significant business event corresponding to the depletion of the tagged items on the put away shelf is collected by the adaptor module 420c, associated with the put away state, and forwarded 620 to the SCM system 422.

While the flow of event data from data collection devices to specific EI systems was described above, the flow of business requests from EI systems and the execution of the resulting device control commands on data collection devices, such as RFID readers, will now be described.

Figure 5:
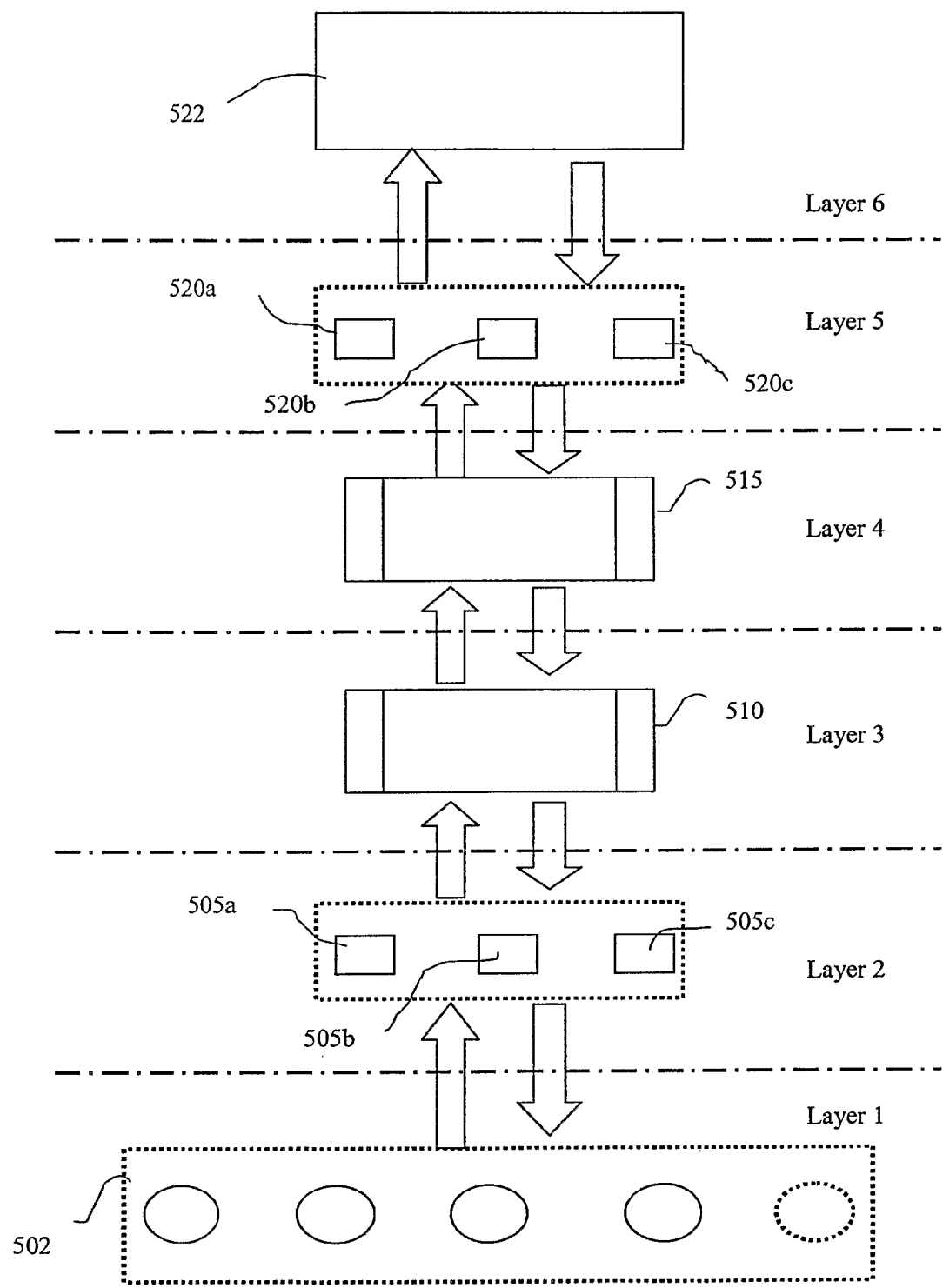
FIG. 5, is a block diagram of the real time RFID network application execution architecture and engine, configured to operate in an inventory management environment.
Figure 7:
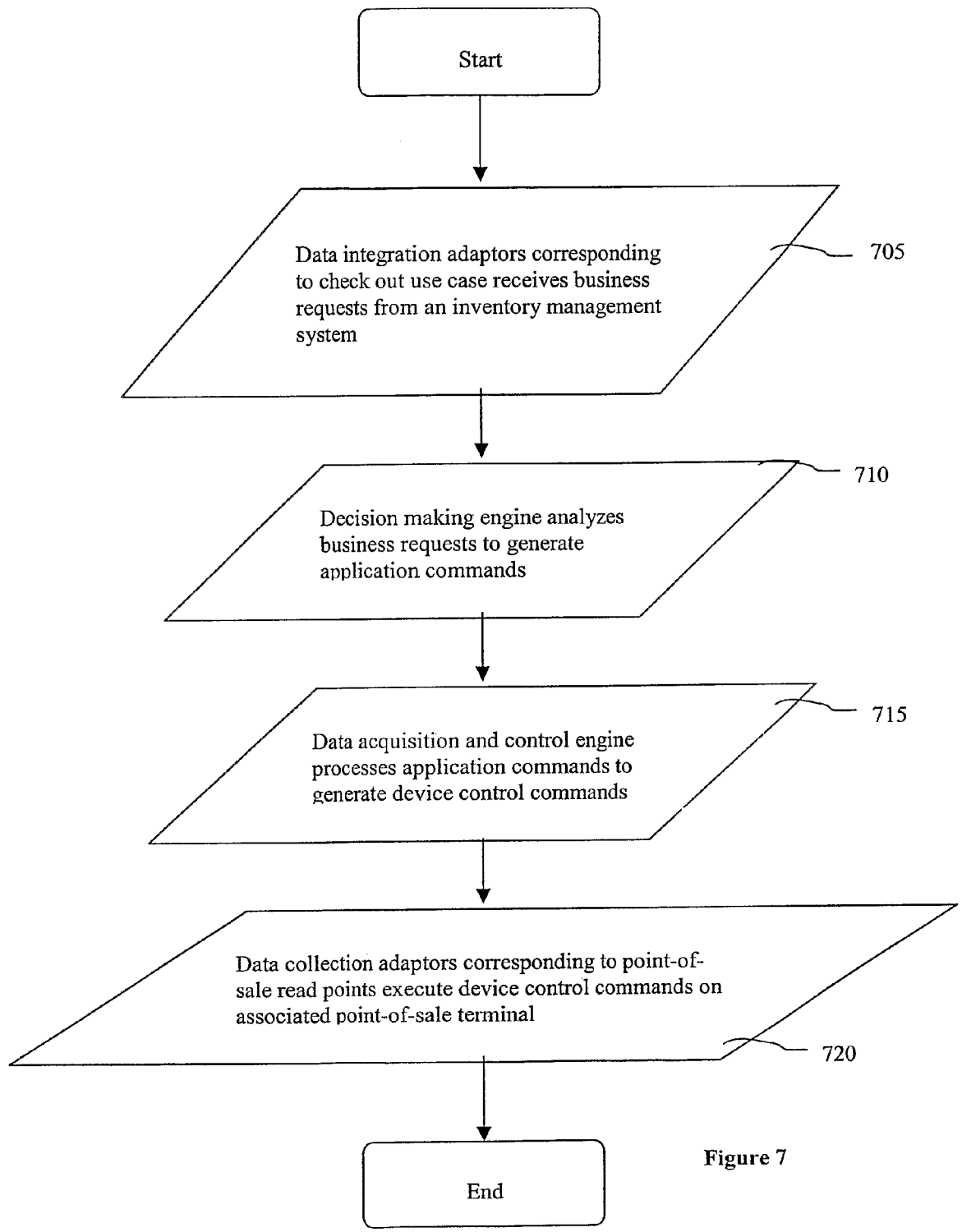
FIG. 7, is a flow chart that illustrates exemplary operations of the edge based real time RFID network application execution architecture and engine for executing business requests in accordance with an embodiment of the present invention.

The flow diagram of FIG. 7 depicts an exemplary operation of the system 100 of FIG. 1, configured and customized to function in a real-time retail store inventory management environment, as shown in FIG. 5. Referring now to FIGS. 5 and 7 simultaneously, the business integration adaptors 520a, b and c correspond to different use case states for a typical inventory management system, such as a receiving state, a check-out state and an inventory monitor state. Adaptors 520a through c for each of the use case states asynchronously receive 705 business requests from an inventory management system 522. In the present exemplary embodiment the inventory management system 522 may issue a business request to monitor and report the check-out counts for a specific item at one or more point-of-sale-terminals. This business request is received by the adaptor 520b, corresponding to the check-out use case state, and forwarded to the decision making engine module 515. The module 515 analyzes 710 the business requests, on the basis of the knowledge and history of business requests that have previously occurred with respect to the use case state, and dispatches corresponding application commands to the data acquisition and control engine 510. The application commands are received asynchronously by the data collection and acquisition engine 505, processed 715 and dispatched as device control commands.

The data collection adaptors 505a, b and c correspond to different read points in a typical retail store, such as a sales floor shelf read point, a back room shelf read point and a point-of-sale read point. Adaptor 505c, corresponding to the point-of-sale read point, receives the incoming device control command for execution 720 on the associated point-of-sale terminal.

In an exemplary embodiment, the present invention can be used to integrate a radio frequency identification and product tracking system with an enhanced warehouse management system to create an integrated solution that identifies, determines, filters and formats significant business events. Samsys UHF RFID readers are deployed as data collection devices capable of reading data from items, such as cases and pallets, tagged with Philips EPC 1.1 Tags. A plurality of asynchronous device adaptors are in data communication with the Samsys UHF RFID Readers and acquire a plurality of physical events whenever tagged cases and pallets are detected by the RFID Readers. The control and data acquisition engine processes these physical events using a gate mode read point filtering state machine to generate and forward potential business events to a decision making engine. The decision making engine executes a use case state machine to identify application events of business significance, such as known pallet received, known case received, known pallet not received, known case not received, unknown pallet not received, unknown case not received, and to forward these significant business events to the warehouse management system using a SOAP-based interface.

In another exemplary embodiment, the present invention can be used to integrate a radio frequency identification and tracking system with an attendance tracking and reporting system to create an integrated solution that identifies, determines, filters and formats significant business events. Matrics AR400 UHF RFID Readers are deployed as data collection devices capable of reading data from items, such as attendee badges, tagged with Philips Matrics Class 0 Gen 1 EPC Tags. A plurality of asynchronous device adaptors are in data communication with the Matrics AR400 UHF RFID Readers and acquire a plurality of physical events whenever tagged attendees are detected by the RFID Readers. The control and data acquisition engine processes these physical events using a two-way gate mode read point filtering state machine to generate and forward potential business events to a decision making engine. The decision making engine executes a use case state machine to identify application events of business significance, such as registered participant entered session, registered participant exited session, correct panelist entered session, panelist exited session, unregistered participant entered session, unregistered participant exited session, wrong panelist entered session, wrong panelist exited session, and to forward these significant business events to the tracking and reporting system using a SOAP-based interface.

The above examples are merely illustrative of the many applications of the system of present invention. Although only a few embodiments of the present invention have been described herein, it should be understood that the present invention might be embodied in many other specific forms without departing from the spirit or scope of the invention. Specifically, numerous events of business significance can be defined and the events described herein do not represent a comprehensive list. Therefore, the present examples and embodiments are to be considered as illustrative and not restrictive, and the invention is not to be limited to the details given herein, but may be modified within the scope of the appended claims.

We claim:

1. A method of determining a plurality of business events, comprising:

acquiring, by a control engine computing device, data associated with a plurality of events from a plurality of data collection devices;

processing, with the control engine computing device, the acquired data using historical data and business logic to identify one or more of the plurality of events that are significant business events, the significant business events associated with an unexpected performance of one or more of the plurality of data collection devices;

dispatching, with the control engine computing device, the data associated with the one or more identified significant business events to at least a subset of a plurality of enterprise systems;

generating, with the control engine computing device, at least one device-specific control command based on at least one business request received from one or more of the subset of the plurality of enterprise systems, the at least one device-specific control command configured to, when executed, alter the performance of at least one of the one or more of the plurality of data collection devices; and communicating, with the control engine computing device, the at least one device-specific control command to the at least one of the plurality of data collection devices.

2. The method of claim 1, wherein the data collection devices comprise RFID readers, bar-code scanners, motion detectors, thermal sensors, pressure sensors, volume-level sensors, smart-card readers, weight sensors, moisture sensors, contact-less payment systems, biometric sensors, 802.11b enabled devices, infrared scanners, electronic displays, magnetic card readers, electronic scales, voice detectors, humidity sensors, gravitometers, or accelerometers.

3. The method of claim 1, wherein the enterprise systems comprise legacy systems, enterprise resource planning systems, customer relationship management systems, supply chain management systems, warehouse management systems, merchandise managements systems, yard management systems, transportation management systems, or asset management systems.

4. The method of claim 1, further comprising:
generating with the control engine computing device at least one application command based on the at least one business request received from the one or more of the subset of the plurality of enterprise systems; and
generating with the control engine computing device the at least one device-specific control command based on the at least one application command.

5. The method of claim 1, wherein:
the data is acquired using a plurality of data collection adaptors;
the one or more significant business events are identified using a real-time decision making engine; and
the one or more significant business events are communicated using a plurality of business integration adaptors.

6. A non-transitory computer-readable storage medium having stored thereon instructions for controlling a plurality of data collection devices, the instructions comprising machine executable code which, when executed by at least one processor, causes the processor to perform steps comprising:
acquiring data associated with a plurality of events from a plurality of data collection devices;
processing the acquired data using historical data and business logic to identify one or more of the plurality of events that are significant business events, the significant business events associated with an unexpected performance of one or more of the plurality of data collection devices;
dispatching the data associated with the one or more identified significant business events to at least a subset of a plurality of enterprise systems;
generating at least one device-specific control command based on at least one business request received from one or more of the subset of the plurality of enterprise systems, the at least one device-specific control command configured to, when executed, alter the performance of at least one of the one or more of the plurality of data collection devices; and
communicating the at least one device-specific control command to the at least one of the plurality of data collection devices.

7. The medium of claim 6, wherein the data collection devices comprise RFID readers, bar-code scanners, motion detectors, thermal sensors, pressure sensors, volume-level sensors, smart-card readers, weight sensors, moisture sensors, contact-less payment systems, biometric sensors, 802.11b enabled devices, infrared scanners, electronic displays, magnetic card readers, electronic scales, voice detectors, humidity sensors, gravitometers, or accelerometers.

8. The medium of claim 6, wherein the enterprise systems comprise legacy systems, enterprise resource planning systems, customer relationship management systems, supply chain management systems, warehouse management systems, merchandise managements systems, yard management systems, transportation management systems, or asset management systems.

9. The medium of claim 6, further having stored thereon instructions further comprising machine executable code which, when executed by the at least one processor, causes the processor to perform steps further comprising:
generating at least one application command based on the at least one business request received from the one or more of the subset of the plurality of enterprise systems; and
generating the at least one device-specific control command based on the at least one application command.

10. The medium of claim 6, wherein:
the data is acquired using a plurality of data collection adaptors;
the one or more significant business events are identified using a real-time decision making engine; and
the one or more significant business events are communicated using a plurality of business integration adaptors.

11. An apparatus comprising:
a memory coupled to one or more processors which are configured to execute programmed instructions stored in the memory, comprising:
acquiring data associated with a plurality of events from a plurality of data collection devices;
processing the acquired data using historical data and business logic to identify one or more of the plurality of events that are significant business events, the significant business events associated with an unexpected performance of one or more of the plurality of data collection devices;
dispatching the data associated with the one or more identified significant business events to at least a subset of a plurality of enterprise systems;
generating at least one device-specific control command based on at least one business request received from one or more of the subset of the plurality of enterprise systems, the at least one device-specific control command configured to, when executed, alter the performance of at least one of the one or more of the plurality of data collection devices; and
communicating the at least one device-specific control command to the at least one of the plurality of data collection devices.

12. The apparatus of claim 11, wherein the data collection devices comprise RFID readers, bar-code scanners, motion detectors, thermal sensors, pressure sensors, volume-level sensors, smart-card readers, weight sensors, moisture sensors, contact-less payment systems, biometric sensors, 802.11b enabled devices, infrared scanners, electronic displays, magnetic card readers, electronic scales, voice detectors, humidity sensors, gravitometers, or accelerometers.

13. The apparatus of claim 11, wherein the enterprise systems comprise legacy systems, enterprise resource planning systems, customer relationship management systems, supply chain management systems, warehouse management systems, merchandise managements systems, yard management systems, transportation management systems, or asset management systems.

14. The apparatus of claim 11, wherein the one or more processors are further configured to execute programmed instructions stored in the memory further comprising:
   generating at least one application command based on the at least one business request received from the one or more of the subset of the plurality of enterprise systems; and
   generating at least one device-specific control command based on the at least one application command.

15. The apparatus of claim 11, wherein:
   the data is acquired using a plurality of data collection adaptors;
   the one or more significant business events are identified using a real-time decision making engine; and
   the one or more significant business events are communicated using a plurality of business integration adaptors.

* * * * *